(12) United States Patent
Mock

(10) Patent No.: US 12,315,211 B2
(45) Date of Patent: May 27, 2025

(54) METHODS, SYSTEMS, AND DEVICES FOR MONITORING A WEB OF MATERIAL TRANSLATING ALONG A TRAVEL PATH

(71) Applicant: Event Capture Systems, Inc., Mint Hill, NC (US)

(72) Inventor: Brian James Mock, Mint Hill, NC (US)

(73) Assignee: Event Capture Systems, Inc., Mint Hill, NC (US)

( * ) Notice: Subject to any disclaimer, the term of this patent is extended or adjusted under 35 U.S.C. 154(b) by 826 days.

(21) Appl. No.: 17/556,091

(22) Filed: Dec. 20, 2021

(65) Prior Publication Data

US 2022/0114715 A1 Apr. 14, 2022

Related U.S. Application Data

(63) Continuation of application No. PCT/US2020/039351, filed on Jun. 24, 2020.

(60) Provisional application No. 62/865,545, filed on Jun. 24, 2019.

(51) Int. Cl.
*G06T 7/00* (2017.01)
*G01N 21/89* (2006.01)
(Continued)

(52) U.S. Cl.
CPC ....... *G06V 10/255* (2022.01); *G01N 21/8903* (2013.01); *G06T 7/001* (2013.01);
(Continued)

(58) Field of Classification Search
CPC ............... G06V 10/255; G06V 10/147; G01N 21/8903; G01N 2021/8912; G01N 2021/8909; G06T 7/001; G06T 7/70; G06T 2200/24; G06T 2207/30124; H04N 23/90; H04N 2013/0081; H04N 13/239
See application file for complete search history.

(56) References Cited

U.S. PATENT DOCUMENTS 6,299,730 B1 * 10/2001 Broek ................... B65H 26/02
356/429
9,172,916 B2 10/2015 Tam et al.
(Continued)

OTHER PUBLICATIONS

ISA/RU, International Search Report and Written Opinion for corresponding PCT Patent Application No. PCT/US2020/039351, mailed Oct. 1, 2020, 6 pages.
(Continued)

*Primary Examiner* — Phuoc Tran
(74) *Attorney, Agent, or Firm* — NK Patent Law

(57) ABSTRACT

A method for identifying defects in a web of material translating along a travel path is provided. The method includes receiving a first image from a first camera; receiving a second image from a second camera; identifying a candidate as a possible defect within the first image; determining a first x-y position of the candidate relative to the first image; identifying the candidate within the second image; and determining the candidate is a probable defect based on the first x-y position and a second x-y position of the candidate within the second image. The first x-y position and the second x-y position predict the candidate is located on the web of material within a margin-of-error.

20 Claims, 11 Drawing Sheets

(51) Int. Cl.
*G06T 7/70* (2017.01)
*G06V 10/147* (2022.01)
*G06V 10/20* (2022.01)
*H04N 23/90* (2023.01)
*G08B 21/18* (2006.01)

(52) U.S. Cl.
CPC .............. *G06T 7/70* (2017.01); *G06V 10/147* (2022.01); *H04N 23/90* (2023.01); *G01N 2021/8912* (2013.01); *G06T 2200/24* (2013.01); *G06T 2207/30124* (2013.01); *G08B 21/18* (2013.01)

(56) References Cited

U.S. PATENT DOCUMENTS

| | | |
|---|---|---|
| 2002/0109112 A1 | 8/2002 | Guha et al. |
| 2004/0052501 A1 | 3/2004 | Tam |
| 2005/0199831 A1* | 9/2005 | Aimonen ........... G01N 21/8903 250/559.07 |
| 2011/0224918 A1* | 9/2011 | Floeder .............. G01N 21/8922 702/35 |
| 2015/0296200 A1 | 10/2015 | Grauer et al. |
| 2016/0381354 A1 | 12/2016 | Jamieson et al. |
| 2017/0064278 A1 | 3/2017 | Posselius et al. |

OTHER PUBLICATIONS

WIPO, International Preliminary Report on Patentability for corresponding PCT Patent Application No. PCT/US2020/039351, issued Dec. 28, 2021, 5 pages.

Mrovlje, Jernej et al.: "Distance measuring based on stereoscopic pictures", 9th International PhD Workshop on Systems and Control: Young Generation Viewpoint, Oct. 1-3, 2008, Izola, Slovenia, 6 pages.

* cited by examiner

METHODS, SYSTEMS, AND DEVICES FOR MONITORING A WEB OF MATERIAL TRANSLATING ALONG A TRAVEL PATH

CROSS-REFERENCE TO RELATED APPLICATION

This application is a continuation of International Patent Application No. PCT/US2020/039351, filed on Jun. 24, 2020, which claims the benefit of U.S. Provisional Patent Application No. 62/865,545, filed on Jun. 24, 2019, the entire contents of both are incorporated herein by reference.

TECHNICAL FIELD

The present invention is directed towards a web monitoring system, and more particularly, to a web monitoring system configured to detect a defect in a web.

BACKGROUND

This invention relates generally to a web monitoring system and associated methods. Web monitoring systems and methods are widely used for capturing video images of random events in a manufacturing environment. Examples of manufacturing environments include a manufacturing facility that may be producing a web such as paper or cardboard. These systems typically operate under video monitoring during which video images of the environment are recorded. Specifically, the video monitoring is configured for detecting a triggering event within the environment. A triggering event may be the capturing of a defect such as a tear or puncture in the web. Upon the occurrence of the event, the video image of the event is thus recorded, or "captured" for later viewing by the system operator. Optionally, at the occurrence of the event, the manufacturing line may be shut down so that the malfunction causing the triggering event may be located and any issues associated therewith may be resolved. After the event is captured, the video image of the event may be replayed so that the event can be analyzed.

Prior systems suffered from an over-inclusion of reporting triggering events. For systems that are user monitored, a user was required to monitor the system at all times and determine, on a case by case basis, whether each triggering event was a defect in the web. False positives may have routinely been detected by prior art systems. For example, a water droplet passing between a monitoring camera and web may be a triggering event captured by the web monitoring system, but is not a defect.

Accordingly, a need exists for methods, devices, and systems that are able to more precisely identify triggering events as defects in the web.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

In one embodiment, a method is disclosed for identifying defects in a web of material. The method includes receiving a first image from a first camera; receiving a second image from a second camera; identifying a candidate as a possible defect within the first image; determining a first x-y position of the candidate relative to the first image; identifying the candidate within the second image; and determining the candidate is a probable defect based on the first x-y position and a second x-y position of the candidate within the second image. The first x-y position and the second x-y position predict the candidate is located on the web of material within a margin-of-error. The web of material may be translating along a travel path. The first image and the second image may also be captured at approximately equivalent times.

In some embodiments, identifying the candidate within the first image may include identifying a first deviation in opaqueness of a portion of the web of material within the first image. Identifying the candidate within the second image may includes identifying a second deviation in opaqueness of a portion of the web of material within the within the second image. The method may further comprise determining the second x-y position based on a relative position of the second deviation within the second image.

Additionally, identifying the candidate within the second image may be based on a predicted x-y position relative to the second image and identifying a second deviation in opaqueness of a portion of the web of material within the within the second image. The method may further comprise determining the predicted x-y position from a known offset of at least an x-axis direction and a y-axis direction. In other embodiments, the method may further comprise determining the predicted x-y position from a look-up table.

In some embodiments, the first image may be received from a first camera. The first camera may have a first axis and a first field-of-view. The first camera may also be positioned in proximity to the web of material. The second image may be received from a second camera. The second camera may have a second axis and a second field-of-view. The second camera may also be positioned to have an overlap of the first field-of-view. The first camera and second camera may also be further positioned such that the overlap is positioned to monitor a portion of the web of material.

In some embodiments, the method may further include determining the predicted x-y position from a known offset of at least an x-axis direction and a y-axis direction. The x-axis direction and the y-axis direction are each approximately perpendicular to the first axis and the second axis. The known offset may also be based on a known pixel offset of the first field-of-view and the second field-of-view at a plane of the web of material.

In some embodiments, the first camera may be further positioned such that the first axis is approximately perpendicular to the web of material and the second camera may be further positioned such that the second axis is approximately perpendicular to the web of material. The predicted x-y position may be based on a known distance along the first axis between the web of material and a first imaging sensor within the first camera. The predicted x-y position may be further based on a known distance along the second axis between the web of material and a second imaging sensor within the second camera. The predicted x-y position may be further based on a known distance between the first imaging sensor and the second imaging sensor.

Upon determining the candidate is a defect, a trigger alert may be transmitted and the trigger alert may include a timestamp and a web material location. Additionally, upon determining the candidate is a defect, the first image and/or the second image by be transmitted to a database and/or a graphical user interface (GUI).

In another embodiment, a computing device is disclosed having a processor and a memory. The processor and the memory are configured for implementing a method of identifying defects in a web of material. The method includes receiving a first image from a first camera; receiving a second image from a second camera; identifying a candidate as a possible defect within the first image; determining a first x-y position of the candidate relative to the first image; identifying the candidate within the second image; and determining the candidate is a probable defect based on the first x-y position and a second x-y position of the candidate within the second image. The first x-y position and the second x-y position predict the candidate is located on the web of material within a margin-of-error. The web of material may be translating along a travel path.

In another embodiment, a non-transitory computer-readable storage medium is disclosed for storing instructions to be executed on a computing device. The computing device includes a processor and a memory. The instructions when executed by the processor cause the computing device to perform a method for identify defects in a web of material. The method includes receiving a first image from a first camera; receiving a second image from a second camera; identifying a candidate as a possible defect within the first image; determining a first x-y position of the candidate relative to the first image; identifying the candidate within the second image; and determining the candidate is a probable defect based on the first x-y position and a second x-y position of the candidate within the second image. The first x-y position and the second x-y position predict the candidate is located on the web of material within a margin-of-error. The web of material may be translating along a travel path.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed invention is not limited to the specific methods and instrumentalities disclosed. In the drawings.

DETAILED DESCRIPTION

Figure 1:
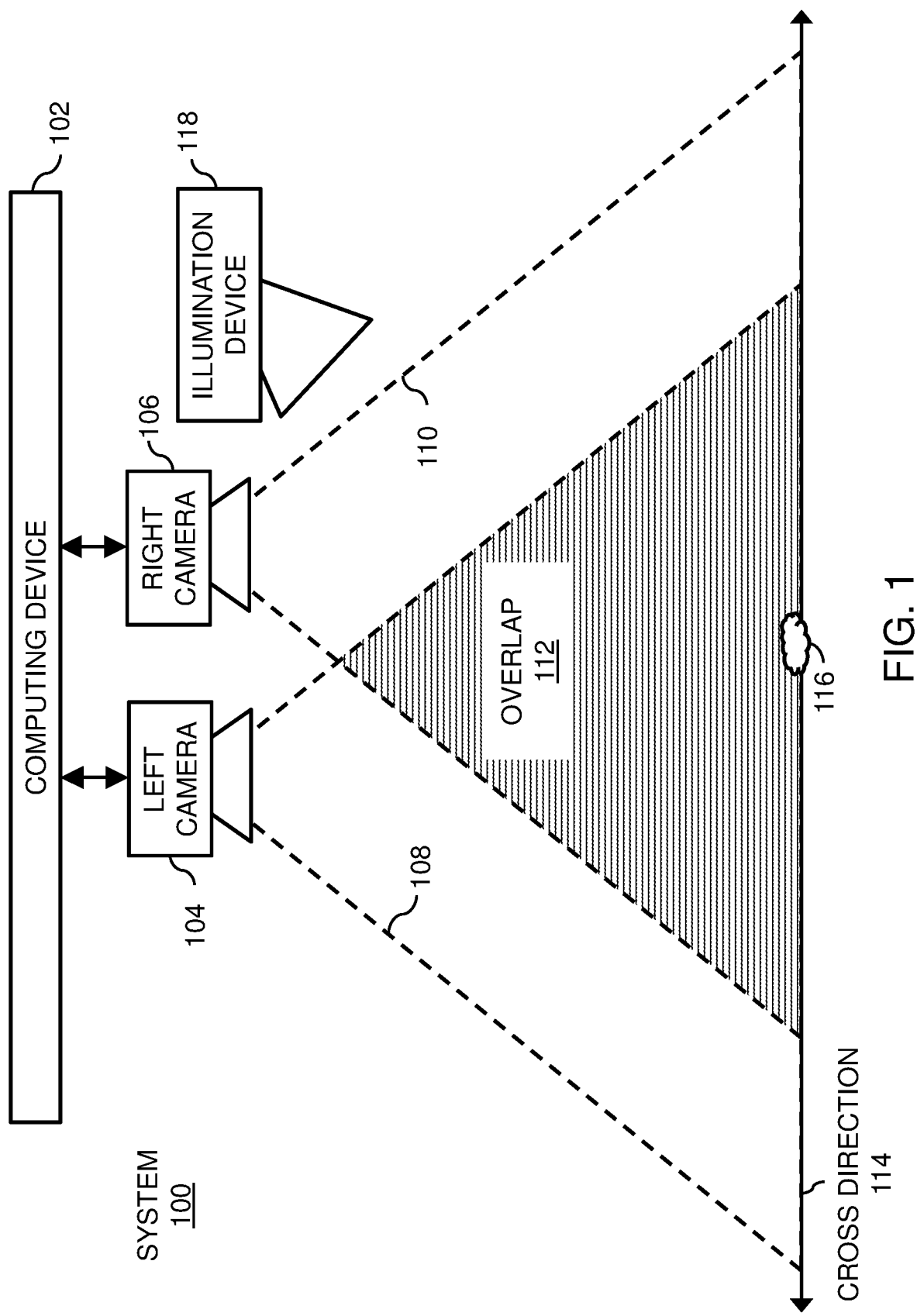
FIG. 1 depicts a block diagram illustrating a system including a left camera and a right camera for monitoring a web of material traveling along a defined path and having a candidate for a defect positioned on the web in accordance with embodiments of the present disclosure.

The presently disclosed subject matter is described with specificity to meet statutory requirements. However, the description itself is not intended to limit the scope of this patent. Rather, the inventors have contemplated that the claimed invention might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Conventional web monitoring systems were configured for detecting a deviation in the web's monitored characteristics, however, those conventional systems were not optimally configured for further determining whether the deviation in the web's monitored characteristics was actually a defect that may require shut down, inspection, and/or repair of the production system. Accordingly, once a deviation was detected by conventional web monitoring systems, the system operator must either shut down the production line and perform an inspection of the web, or continue running the production line and risk further damage thereto. The one or more web monitoring systems disclosed herein are configured for determining whether those monitored deviations are a defect in the web that may require further investigation.

As such, disclosed herein are methods, devices, and systems for monitoring a web of material traveling along a path that may be defined along a web production line. The web production line may have a wet end section, press end section, dryer section, additional web sections, and reel sections. These sections may be present in some industrial processes such as that which may be found in a paper production facility, but the devices, systems and methods disclosed herein are equally applicable to other industrial settings.

Cameras disclosed herein may be configured for monitoring the web of material and recording characteristics thereof and outputting those characteristics to one or more computing devices. The computing devices may compare the recorded characteristics of the web with various predetermined characteristics thereof. In some instances, these variations, which are also referred to as candidates for a defect, in the monitored characteristics of the web may be a defect, while, in other instances, these variations in the monitored characteristics of the web may not be a defect, and may instead be a variation in predetermined characteristics that may be expected or within acceptable ranges. In other instances, the disclosed cameras may capture a foreign object that is carried along with the web, but is not positioned on the web and does not represent a defect.

The monitored characteristics of the web may include density, opacity, speed, weight, and/or fiber count. In one or more embodiments, the cameras may measure the gray-scale intensity of the web and computing devices may be configured for detecting a defect in the web when the cameras measure a variation in the expected gray-scale intensity of the web.

Conventional web monitoring systems are not configured for determining whether a measured variation in the expected gray-scale intensity of the web was a defect or a false defect detected by the camera. For example, a camera and light could be positioned at a cut line for the web. This cut line may be made by a trim squirt cut in which a high pressure stream of water is directed at the web. In this example, a false defect such as a water droplet (i.e. foreign object) could be detected by the camera at the trim squirt cut line. The water droplet would register a variation in the gray-scale intensity of the web within the respective region of interest.

The methods, devices, and systems presently disclosed are configured for determining whether the variations in the measured characteristics of the web are a true defect or a false defect. As used herein, a variation in the measured characteristics of the web that has not yet determined to be a true defect or a false defect will be termed as a candidate for a defect.

FIG. 1 depicts a block diagram illustrating a system 100 for monitoring a web of material traveling along a defined path. The defined path is commonly referred to as a machine direction. The system 100 includes a computing device 102, a left camera 104, and a right camera 106. The computing device 102 is configured to receive a plurality of images from both the left camera 104 and the right camera 106 as the web of material translates along a travel path. The left camera 104 and the right camera 106 may each be a line scan camera that compiles lines of pixels to produce a two dimensional image, or may each be an area scan camera capable of capturing a larger field-of-view.

The left camera 104 is positioned to have a left field-of-view 108 and the right camera 106 is positioned to have a right field-of-view 110. The left field-of-view 108 and the right field-of-view 110 form an overlap 112 that is configured to monitor a given section of the web of material. A cross direction 114 spans from a left edge to a right edge of the web of material. The cross direction 114 is perpendicular to the defined path (i.e. machine direction). A left camera axis and a right axis are each approximately perpendicular to a web plane defined by the cross direction 114 and the machine direction. The machine direction of FIG. 1 is perpendicular with the illustration. A candidate defect 116 is illustrated on the web plane and therefore is probably a real defect. Additionally, an illumination device 118 is configured to provide additional lamination for the left camera 104 and the right camera 106 beyond the ambient illumination. The illumination device 118 may also provide illumination for a human operator or observer (not shown in FIG. 1) for the system 100.

Additionally, the left camera 104 and the right camera 106 may be positioned proximal to a region of interest of the web of material. The region of interest may be any region along a manufacturing line in which a defect of the web of material is likely be found. For example, a region of interest may be defined about the press section of the manufacturing line where defects are likely to occur because of the contact between a press and the web of material.

In one or more embodiments, the left camera 104 and the right camera 106 may be hard-wired to the computing device 102. In other embodiments, the left camera 104 and the right camera 106 may be in wireless communication with the computing device 102. Still in one or more embodiments, the left camera 104 and the right camera 106 may have internalized electronic and programming components such that computing device 102 is not needed. The computing device 102 may be any suitable computer and/or server configured for receiving images from the left camera 104 and the right camera 106.

In some embodiments, the system 100 may have additional cameras positioned to capture a much larger region of interest or to allow the cameras to be positioned closer to the web material.

Figure 2:
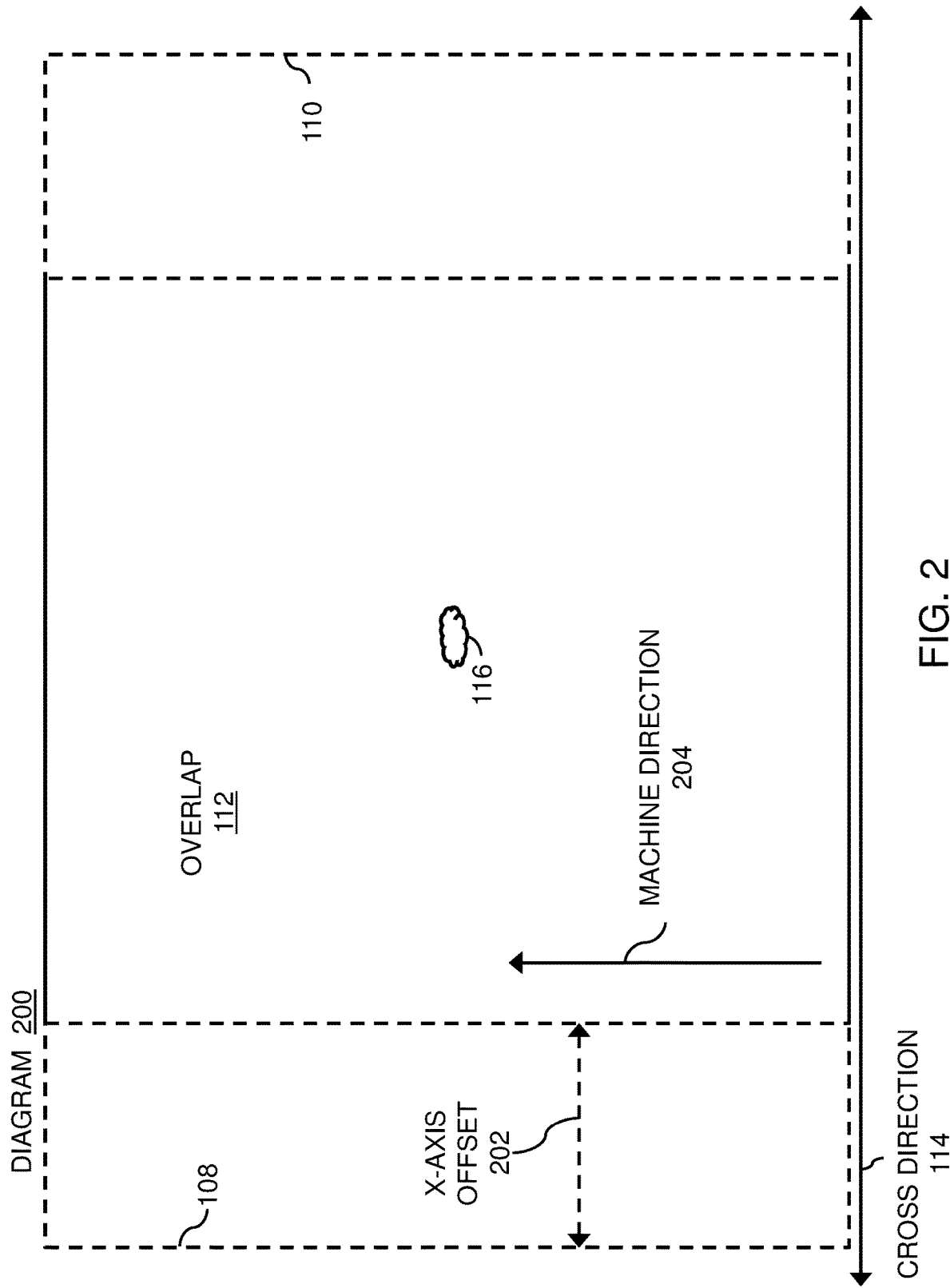
FIG. 2 depicts a diagram illustrating a field-of-view overlap of a left camera field-of-view and a right camera field-of-view, and the candidate of FIG. 1 in accordance with embodiments of the present disclosure.

FIG. 2 depicts a diagram 200 illustrating the overlap 112 of the left camera field-of-view 108, and the right camera field-of-view 110, and the candidate 116 positioned on the web in accordance with embodiments of the present disclosure. Diagram 200 also illustrates the cross direction 114 and the machine direction 204. An x-axis offset 202 that is known to the computing device 102 is shown and may be used in determining if the candidate for a defect is positioned on the web of material.

For example, the left camera 104 and the right camera 106 may each have a resolution of 4880×3232 (approximately 16 Mega-pixels). If the left camera 104 and the right camera 106 are positioned to have an approximately 80% field of view overlap on an x-axis and approximately 100% field of view overlap on a y-axis, then any candidate 116 should have approximately the 20% offset on a relative x-axis when analyzing an image from the left camera 104 and an image of the right camera 106 captured at approximately the same time. This 20% offset would equate to approximately a 976 pixel x-axis offset (i.e. 4880×20%). In certain embodiments the camera resolutions may be greater or less depending on accuracy needed and cost considerations in camera purchases.

Figure 3:
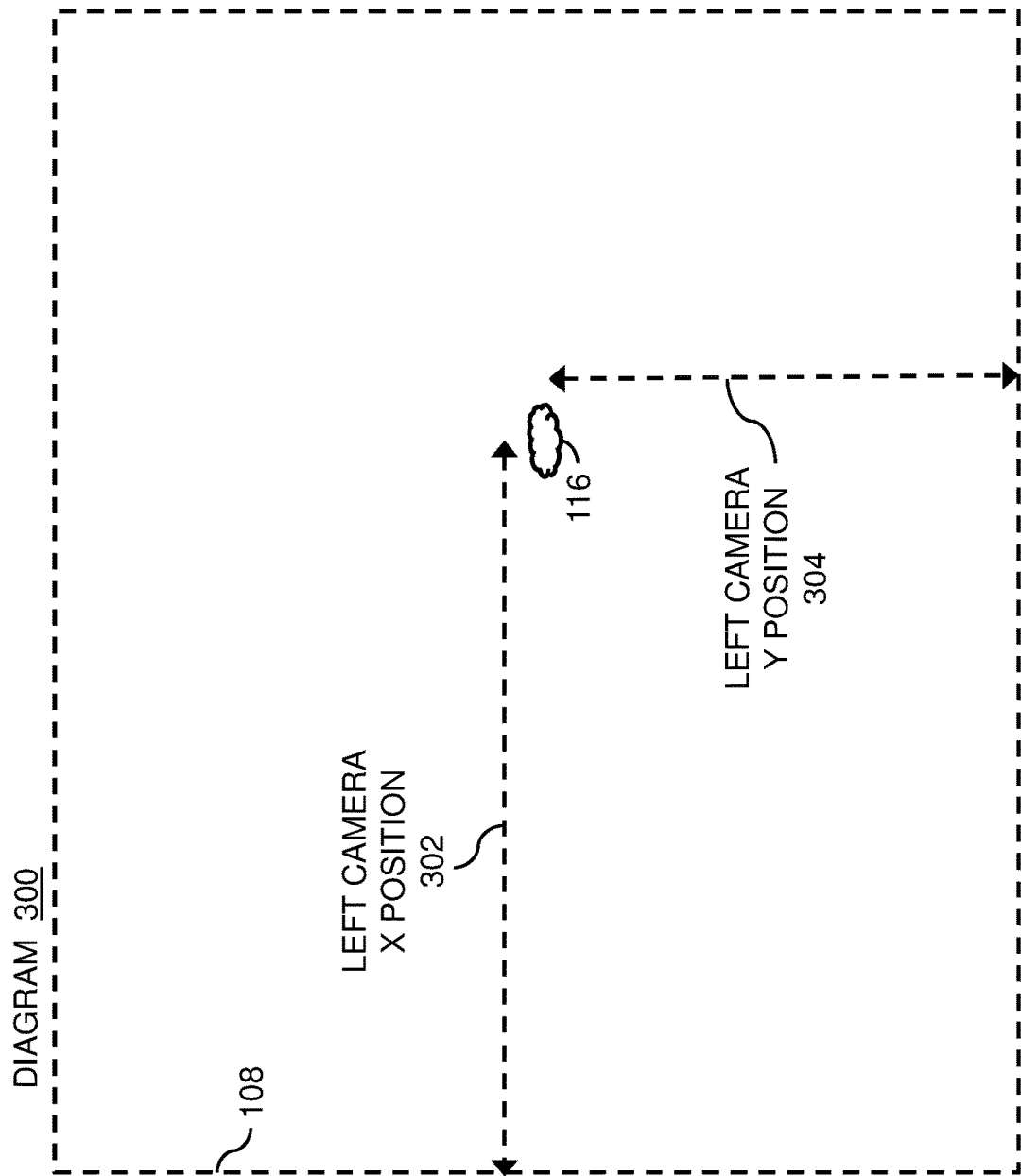
FIG. 3 depicts an image captured by the left camera at the time shown in FIG. 2 in accordance with embodiments of the present disclosure.

FIG. 3 depicts an image 300 captured by the left camera 104 at the time shown in FIG. 2 and received by the computing device 102 in accordance with embodiments of the present disclosure. The computing device 102 may detect the candidate 116 within the image 300 by identifying a deviation in opaqueness in the region of interest. The computing device may also identify a centroid location or other unique reference location of the candidate 116 (e.g. opaqueness) and then determine a left camera X position 302 and a left camera Y position 304 within the image 300. For example, the left camera X position 302 may be determined at 3220 pixels of the 4880 pixels of x-axis of resolution and the left camera Y position 304 may be determined at 1616 pixels of the 3232 pixels of y-axis of resolution.

Figure 4:
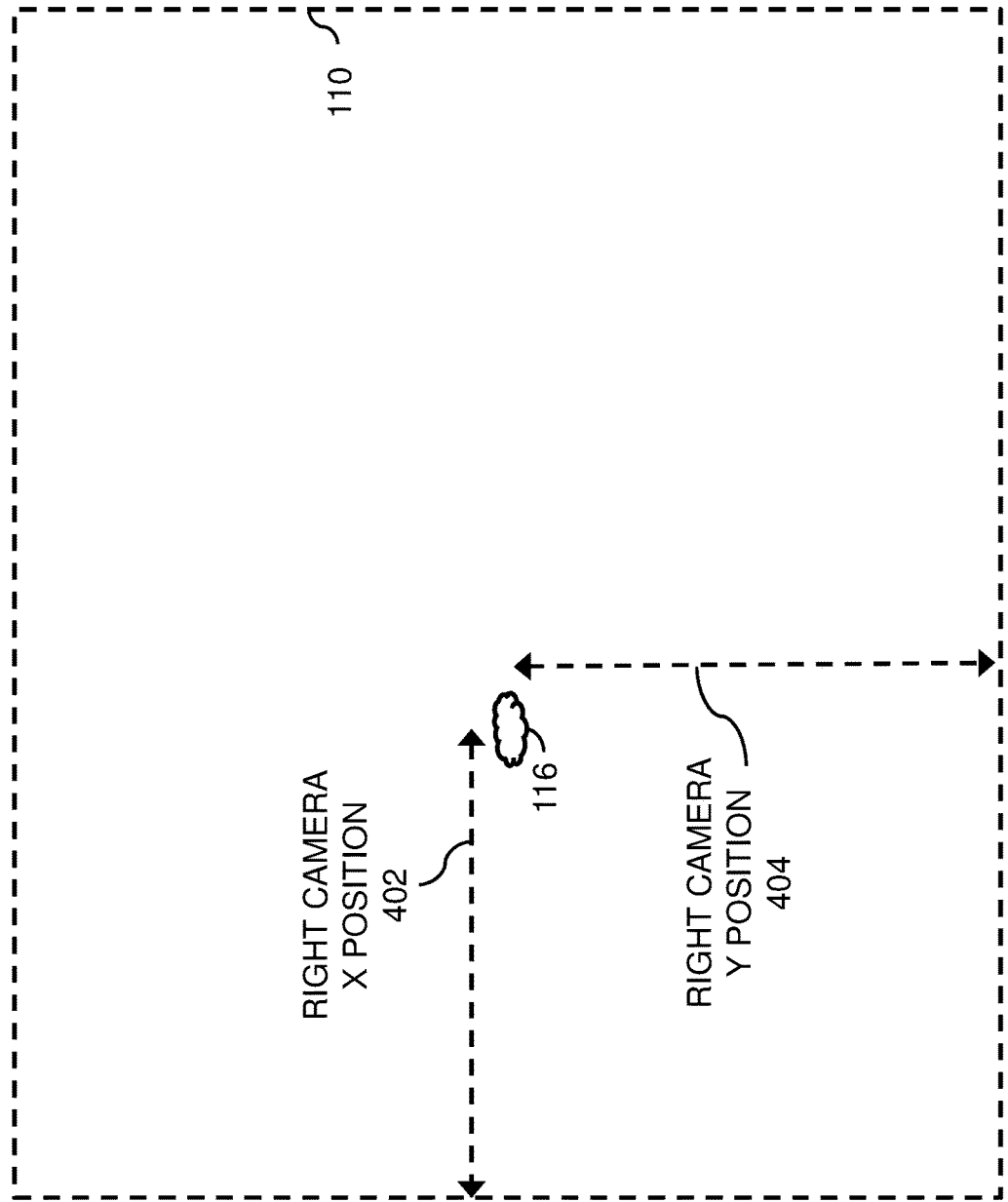
FIG. 4 depicts an image captured by the right camera at the time shown in FIG. 2 in accordance with embodiments of the present disclosure.

FIG. 4 depicts an image 400 captured by the right camera 106 at the time shown in FIG. 2 and received by the computing device 102 in accordance with embodiments of the present disclosure. After the computing device 102 analyzes the image 300 of FIG. 3, a prediction of the right camera X position 402 may be determined at 2244 pixels of the 4880 pixels of x-axis of resolution. Specifically, the 976 pixel x-axis offset is subtracted from the left camera X position 302 of 3220 pixels. Since the left camera 104 and the right camera 106 are positioned to have minimal offset on the y-axis, the left camera Y position 304 is used for the right camera Y positon 404 (e.g. 1616 pixels). The computing device 102 then analyzes the image 400 at the right camera X position 402 (e.g. 2244 pixels) and the right camera Y position 404 (e.g. 1616 pixels) to determine if a similar opaqueness is observed. If the similar opaqueness is observed of the candidate 116 of image 300 within a predetermined margin-of-error, then the candidate 116 is determined to be at or near a plane of the web material and may be a real defect with the web requiring further analysis to increase probability of correct detection.

In some embodiments in addition to the x-axis offset 202, there may be a known y-axis offset between the left camera 104 and right camera 106. In this scenario, the known y-axis offset is used in a similar fashion to the x-axis offset to determine if the candidate is at or near the plane of the web material.

In other embodiments, the computing device 102 analyzes the image 400 independently to identify the candidate 116 as described with image 300 and then determines the right camera X position 402 and the right camera Y position 404 using a centroid location or other unique reference location of the candidate 116. Next the computing device compares the left camera X camera position 302 with the right camera X position 402 and compares the left camera Y camera position 304 with the right camera Y position 404. From this comparison, the computing device 102 uses a predetermined margin-of-error for the x-y coordinate sets to determine if the candidate 116 is at or near the plane of the web material.

In other embodiments, the computing device 102 may use a look-up table to determine predicted x-y positions of the candidate between image 300 and image 400.

The further analysis is required after determining the candidate 116 is at or near the plane of the web material, because the candidate 116 may actually be a shadow from a foreign object (e.g. particle) floating above the web material. Or, the candidate 116 may be a foreign object positioned fairly close to the web material and within a margin-of-error of the previously described methods. As such in these scenarios, the candidate 116 is not a defect.

The further analysis may be conducted by additional machine vision analysis by capturing additional images at later times as the candidate 116 progresses with the web material in the machine direction 204. This further analysis may be conducted using one or more methods described in co-owned U.S. patent application Ser. No. 13/323,543 titled "WEB MONITORING SYSTEM", which issued Oct. 27, 2015 as U.S. Pat. No. 9,172,916, the contents of which are incorporated by reference herein.

One such method of U.S. Pat. No. 9,172,916 includes additional monitoring of one or more characteristics of the candidate 116 at one or more subsequent time frames. The additional monitoring may use additional images from the left camera 104 and/or right camera 106. The additional monitoring may also use additional cameras (not shown in FIG. 1) such that the candidate 116 may be monitored at a subsequent time when certain areas of the web material and the candidate 116 have travelled outside the capture range of the left camera 104 and/or right camera 106. The method also includes monitoring the certain areas of the web material for characteristics such as a position, a speed of travel, and/or a direction of travel along the machine direction 204 at one or more subsequent time frames. Then by comparing the one or more characteristics of the candidate 116 to the characteristics of the certain areas of the web material, a determination can be made that the candidate 116 is most likely a defect.

More specifically, the method may include comparing one or more characteristics of a leading edge of the candidate 116 at a first and second time to the one or the more characteristics of the certain areas of the web material at the first and second times. Making the determination at a leading edge of the candidate 116 may be important since a tear (i.e. actual defect) in the web material may enlarge on the trailing edge portions, while a determination at a leading edge would still lead to a correct determination of an actual defect. The method may also include assigning and monitoring a first vector corresponding to the machine direction 204 and a second vector corresponding to a direction of travel of the candidate 116. The method may also include assigning and monitoring a first speed corresponding to the machine direction 204 and a second speed corresponding to a direction of travel of the candidate 116.

If the monitored characteristics (e.g. direction and/or speed) of the candidate 116 are determined to be within a selected range of values, then the computer device 102 may determine that the candidate is likely a defect. If the monitored characteristics of the candidate 116 are determined to be outside of the selected range of values, then the computing device 100 may determine that the candidate is most likely not a defect.

Upon determining the candidate 116 is most likely a defect, a trigger alert may be transmitted by the computing device 102. The trigger alert may include a timestamp and a web material location. Additionally, upon determining the candidate is a defect, the first image (FIG. 2.) and/or the second image (FIG. 3) by be transmitted to a database and/or a graphical user interface (GUI).

Figure 5:
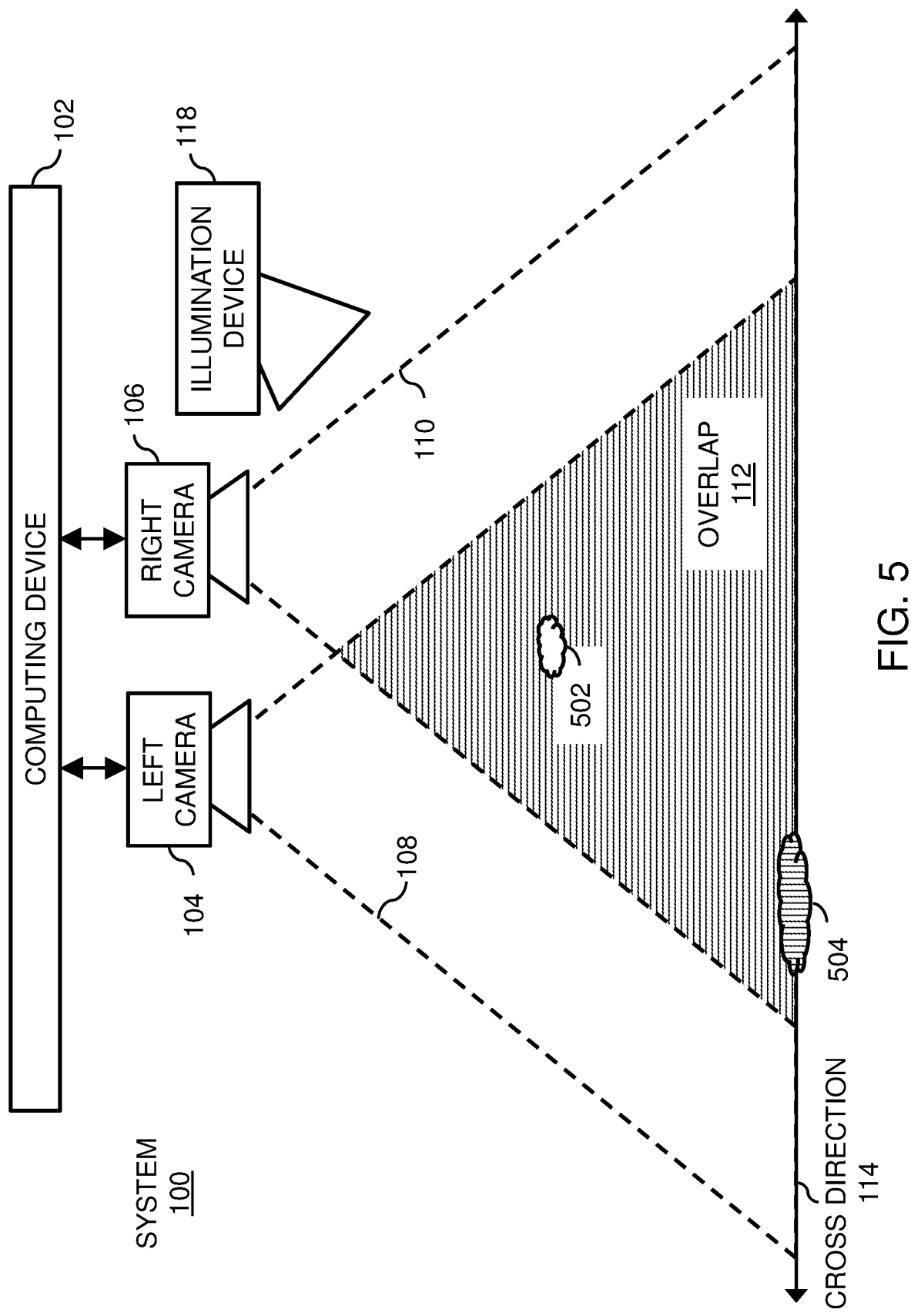
FIG. 5 depicts a block diagram illustrating the system of FIG. 1 and having a candidate for a defect positioned between the web, and the left camera and the right camera in accordance with embodiments of the present disclosure.

FIG. 5 depicts a block diagram illustrating the system 100 of FIG. 1 and having a candidate 502 for a defect positioned between the web, the left camera 104, and the right camera 106 in accordance with embodiments of the present disclosure. In this scenario, the candidate 502 is a foreign object and not associated with the web of material. Additionally, FIG. 5 depicts a shadow 504 on the web produced by the illumination device 118 and the candidate 502.

Figure 6:
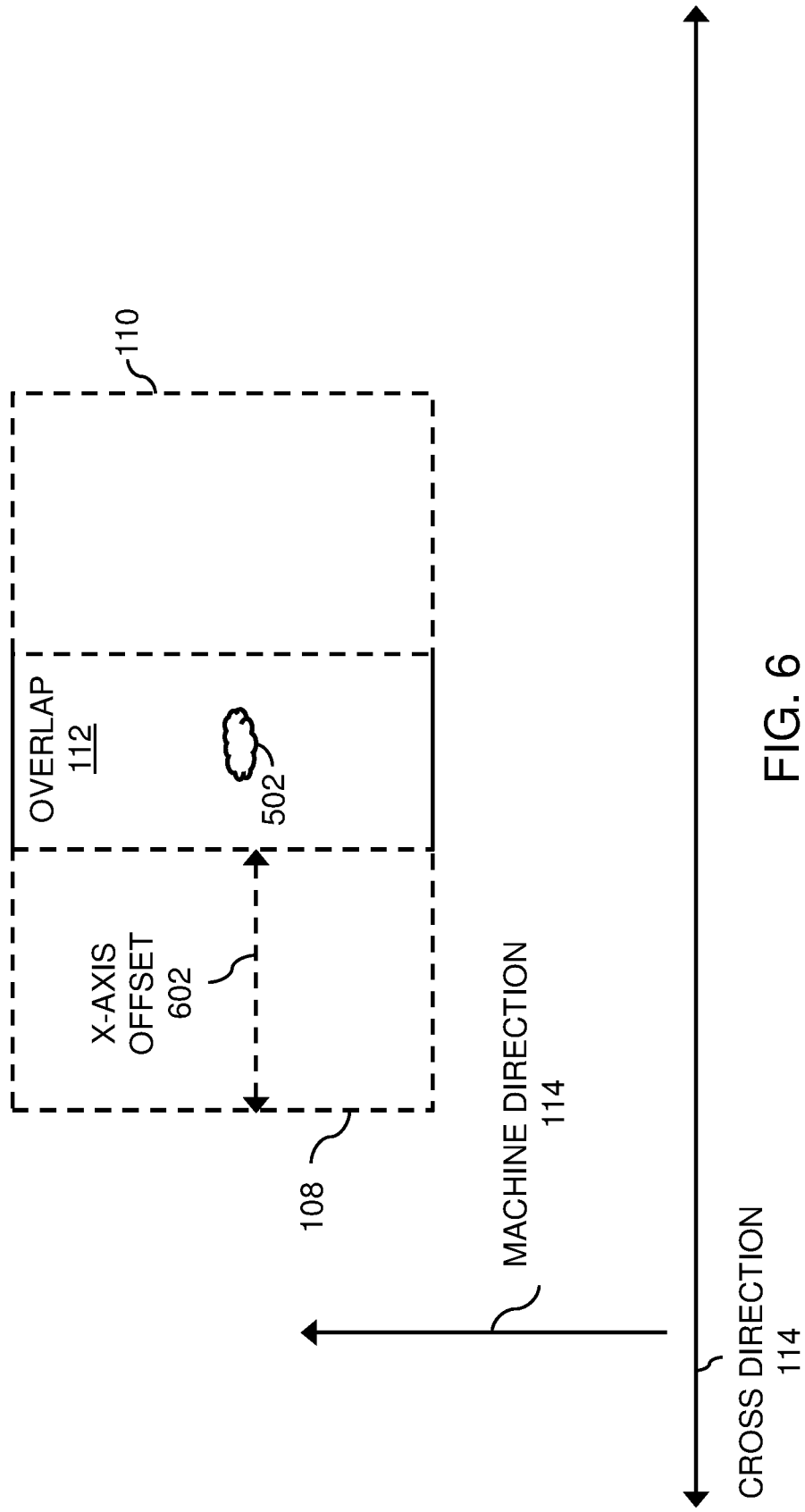
FIG. 6 depicts a diagram illustrating the field-of-view overlap of the left camera field-of-view and the right camera field-of-view, and the candidate of FIG. 5 in accordance with embodiments of the present disclosure.
Figure 7:
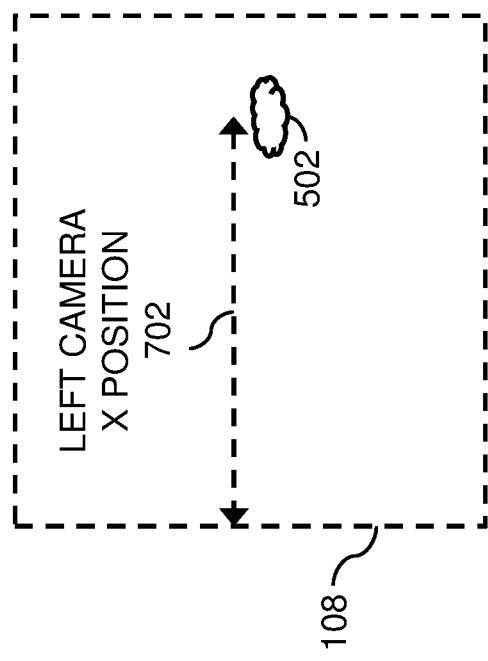
FIG. 7 depicts an image captured by the left camera at the time shown in FIG. 6 in accordance with embodiments of the present disclosure.
Figure 8:
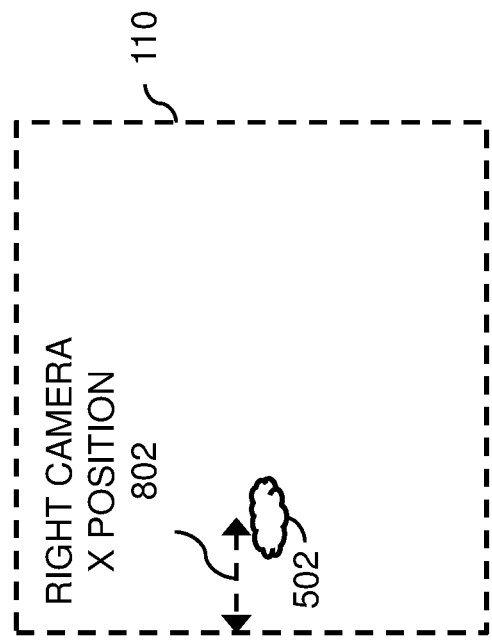
FIG. 8 depicts an image captured by the right camera at the time shown in FIG. 6 in accordance with embodiments of the present disclosure.

FIG. 6, FIG. 7, and FIG. 8 depict candidate 502 as candidate 116 was described with FIG. 2, FIG. 3, and FIG. 4; and will make a determination that the candidate 502 is not positioned on the web of material.

FIG. 6 depicts a diagram 600 illustrating the field-of-view overlap 112 of the left camera field-of-view 108 and the right camera field-of-view 110, and the candidate 502 of FIG. 5 in accordance with embodiments of the present disclosure. Diagram 600 also re-illustrates the cross direction 114 and the machine direction 204. An x-axis offset 602 is depicted for the plane associated with the position of candidate 502. The x-axis offset 602 is approximately a 60% offset on a relative x-axis when analyzing an image from the left camera 104 and an image of the right camera 106 captured at approximately the same time and on the plane associated with the position of candidate 502. This 60% offset would equate to approximately a 2928 pixel x-axis offset (i.e. 4880×60%).

FIG. 7 depicts an image 700 captured by the left camera 104 at the time shown in FIG. 6 and received by the computing device 102 in accordance with embodiments of the present disclosure. As with FIG. 3, the computing device 102 may detect the candidate 502 within the image 700 by identifying a deviation in opaqueness in the region of interest. The computing device may also identify a centroid location or other unique reference location of the candidate 502 (e.g. opaqueness) and then determine a left camera X position 702 and a left camera Y position (not shown in FIG.

7) within the image 300. For example, the left camera X position 702 may be determined at 3804 pixels of the 4880 pixels of x-axis of resolution.

FIG. 8 depicts an image 800 captured by the left camera 104 at the time shown in FIG. 6 and received by the computing device 102 in accordance with embodiments of the present disclosure. After the computing device 102 analyzes the image 700 of FIG. 7, a prediction of the right camera X position 402 may be determined at 2828 pixels of the 4880 pixels of x-axis of resolution. Specifically, the expected 976 pixel x-axis offset (of FIG. 2) is subtracted from the left camera X position 702 of 3804 pixels. Again, since the left camera 104 and the right camera 106 are positioned to have minimal offset on the y-axis, the left camera Y position is used for the right camera Y positon. The computing device 102 then analyzes the image 800 at 2828 pixels and the right camera Y position to determine if a similar opaqueness is observed. Since the similar opaqueness is not observed of image 800 of the candidate 502 of image 700 within the predetermined margin-of-error, then the candidate 502 is determined to not be at or near a plane of the web material and is most likely not a real defect (i.e. a foreign object).

Returning to FIG. 5, the shadow 504 may be detected by the computing device 102 as a deviation in opaqueness in the region of interest. However, the shadow 504 may be analyzed as discussed earlier to the methods of U.S. Pat. No. 9,172,916. For example, the shadow 502 may not move at the same speed and direction as the web material. As such, the shadow 504 will be ruled out as being an actual defect. Additionally, the candidate 502 may be monitored to one or more of the methods of U.S. Pat. No. 9,172,916 to improve a probability that the candidate 502 is also not an actual defect.

In certain embodiments, the system 100 may be simultaneously monitoring and actively analyzing 1 to 10 candidates and/or shadows over a given time interval based on camera speeds and computing power. In other embodiments, the system 100 may be simultaneously monitoring and actively analyzing 11 to 100 candidates and/or shadows over the given time interval. In still other embodiments, the system 100 may be simultaneously monitoring and actively analyzing 101 to 1000 candidates and/or shadows over the given time interval.

Figure 9:
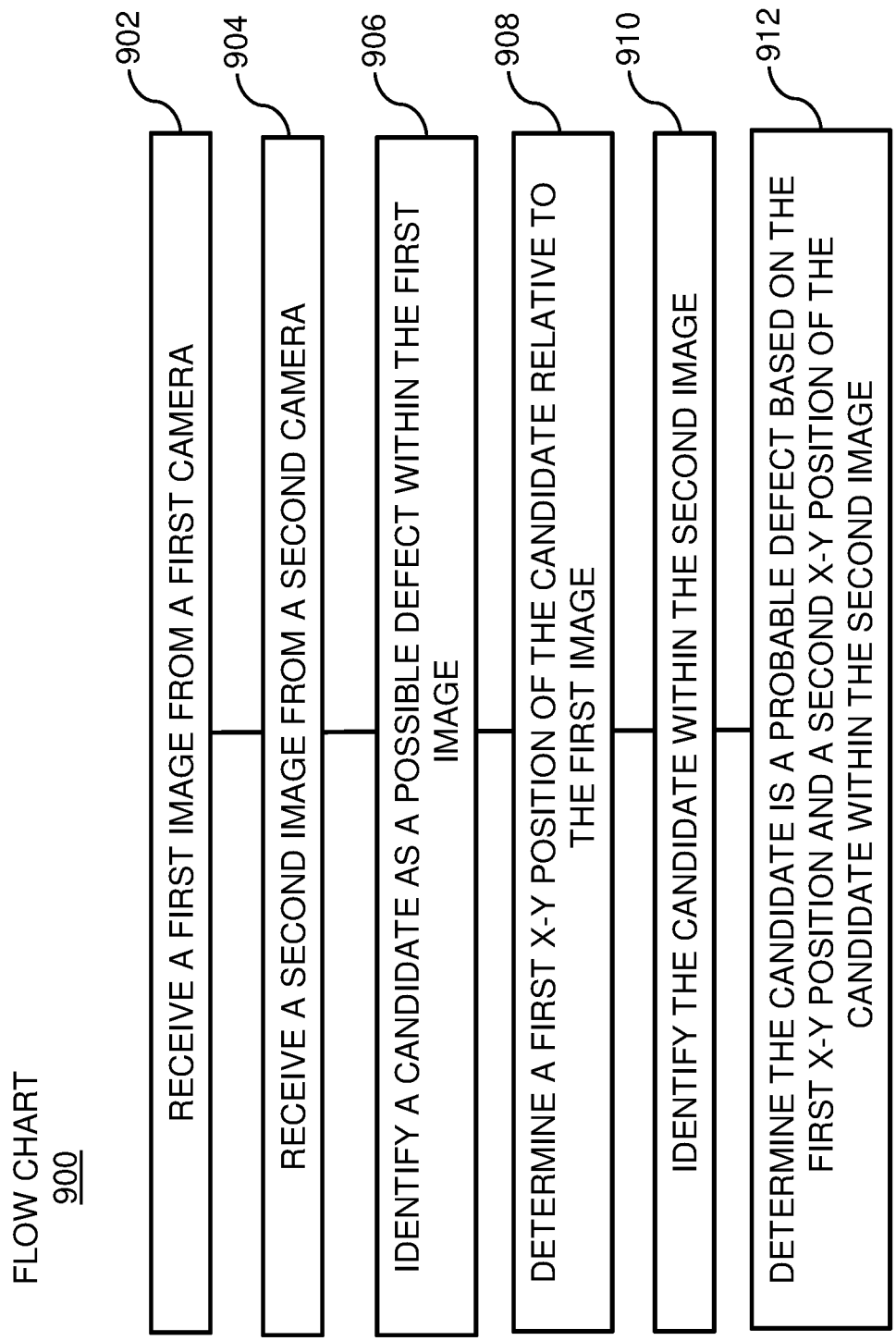
FIG. 9 depicts a flowchart illustrating a method for identifying defects in a web of material of traveling along a defined path in accordance with embodiments of the present disclosure.

FIG. 9 depicts a flowchart 900 illustrating a method for identifying defects in a web of material in accordance with embodiments of the present disclosure. In step 902, the method includes receiving a first image from a first camera. In step 904, the method includes receiving a second image from a second camera. In step 906, the method includes identifying a candidate as a possible defect within the first image. In step 908, the method includes determining a first x-y position of the candidate relative to the first image. In step 910, the method includes identifying the candidate within the second image. In step 912, the method includes determining the candidate is a probable defect based on the first x-y position and a second x-y position of the candidate within the second image. Also in step 912, the first x-y position and the second x-y position predict the candidate is located on the web of material within a margin-of-error.

Figure 10:
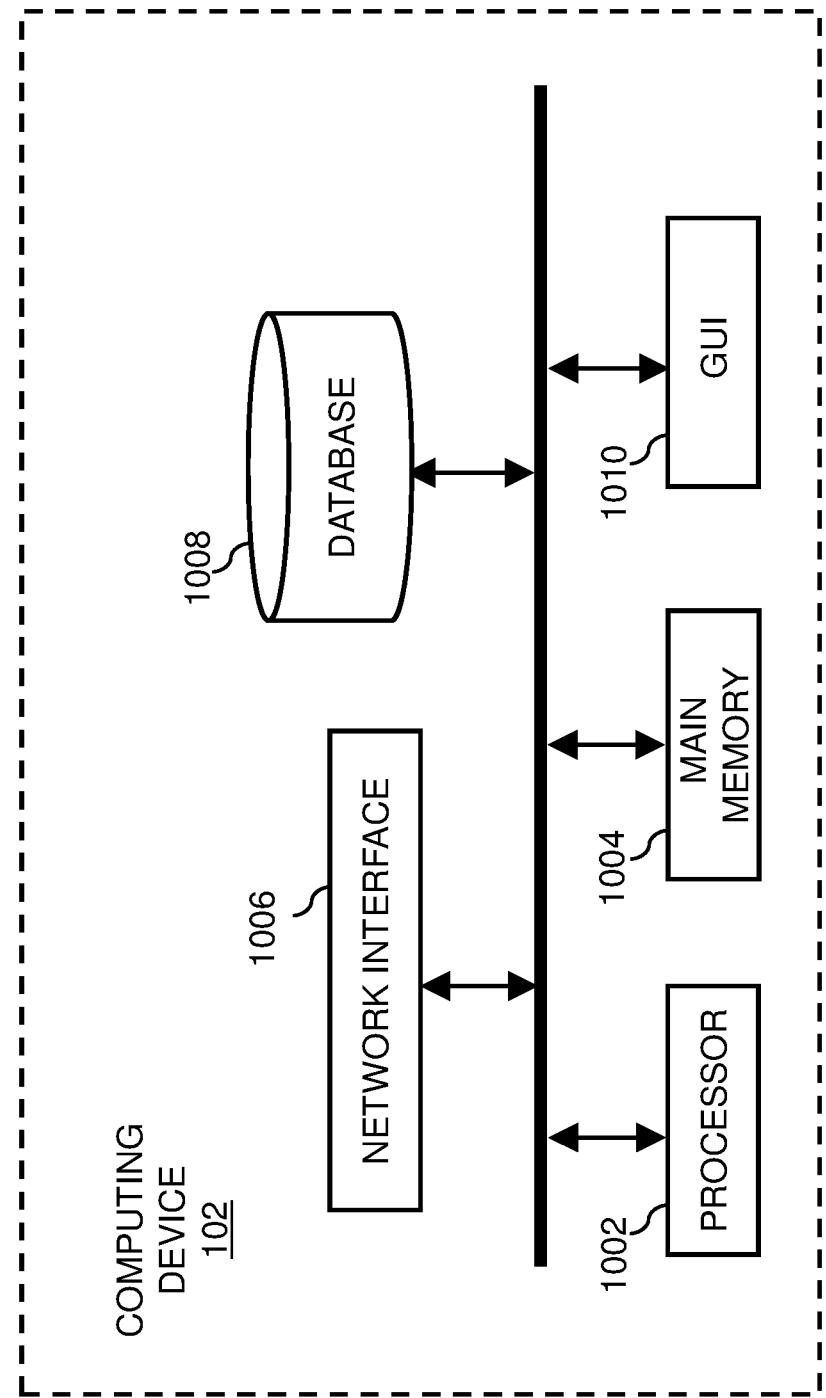
FIG. 10 depicts a block diagram illustrating a computing device for implementing the method of FIG. 9 in accordance with embodiments of the present disclosure.

FIG. 10 depicts a block diagram 1000 illustrating the computing device 102 of FIG. 1 and FIG. 5 for implementing the method of FIG. 9 in accordance with embodiments of the present disclosure. The computing device 102 includes a processor 1002, a main memory 1004, a network interface 1006, a database 1008, and a graphical user interface (GUI) 1010. Images may be received from the left camera 104 and the right camera 105 via the network interface 1006, or other hardwired or wireless method (not shown in FIG. 10). The GUI 1010 may be used for reviewing recordings provided by the left camera 104 and/or the right camera. 106. The GUI 1010 may also be used for reviewing tagged images, timestamps and web of material locations identified as having defects.

Figure 11:
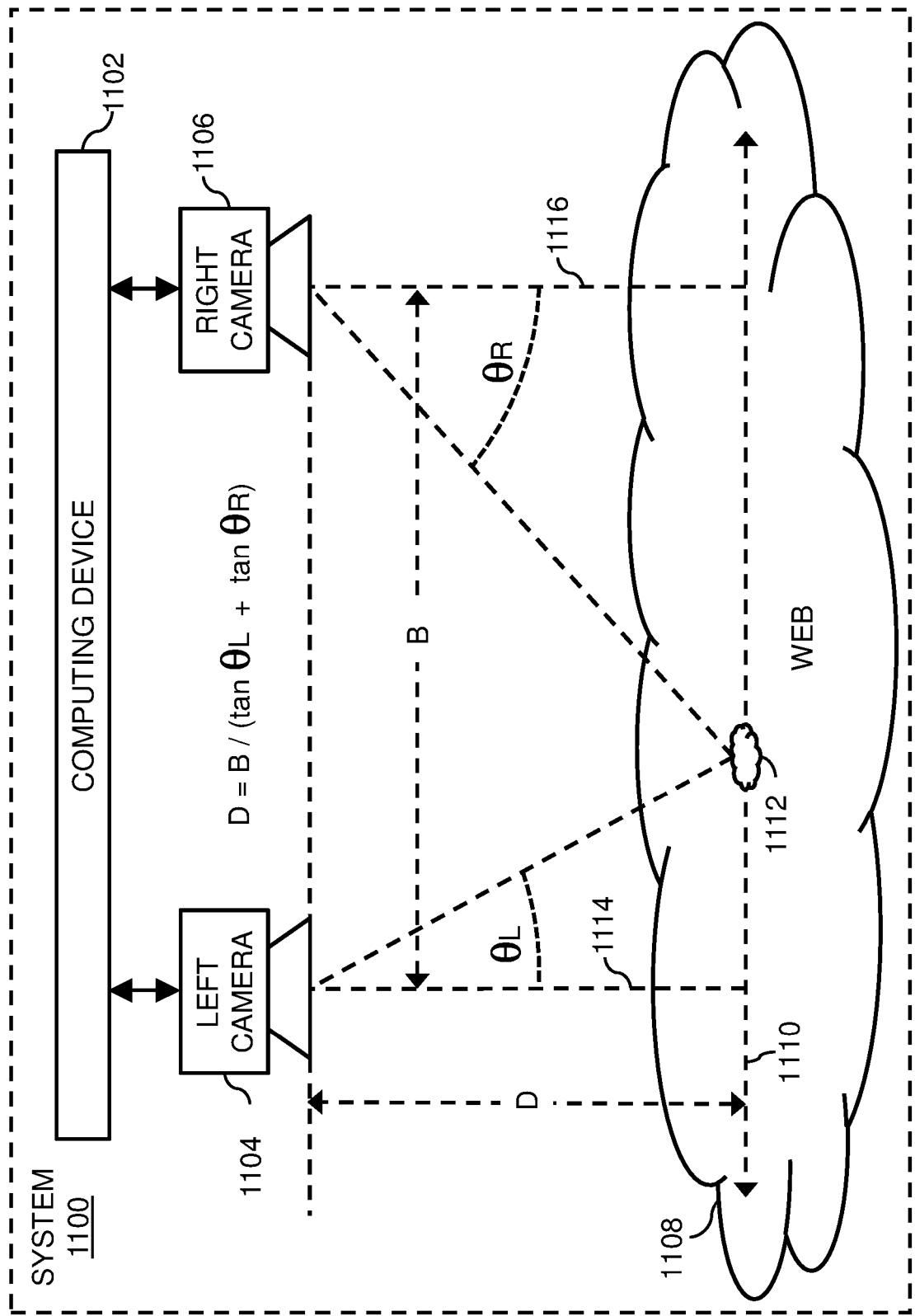
FIG. 11 depicts a block diagram illustrating a system including a left camera and a right camera for monitoring a web traveling along a defined path "P" and having a candidate defect positioned on the web in accordance with embodiments of the present disclosure.

FIG. 11 depicts a block diagram illustrating another system 1100 that includes a computing device 1102, a left camera 1104, and a right camera 1106 for monitoring a web 1108 of material traveling along a defined path as described in FIG. 1 and in accordance with embodiments of the present disclosure. The computing device 1102 is configured to receive a plurality of images from both the left camera 1104 and the right camera 1106 as the web of material translates along the travel path. The left camera 1104 and the right camera 1106 may each be a line scan camera that compiles lines of pixels to produce a two dimensional image, or may each be an area scan camera capable of capturing a larger field-of-view.

The left camera 1104 and the right camera 1106 are positioned apart by a distance "B" and to have overlapping fields-of-view and configured to monitor a given section of the web 1108. A cross direction 1110 and a candidate 1112 for a defect is also depicted. A cross direction 1110 spans from a left edge to a right edge of the web of material. The cross direction 1110 is perpendicular to the defined path (i.e. machine direction). A left camera axis 1114 and a right camera axis 1116 are each approximately perpendicular at a known distance "D" to a plane of the web 1108 defined by the cross direction 1110 and the machine direction. The machine direction of FIG. 11 is perpendicular with the illustration. The candidate defect 1112 is illustrated on the web plane and therefore is probably a real defect.

The computing device 1102 receives a left camera image from the left camera 1104 and a right camera image from the right camera 1106 each captured at approximately the same time. The computing device 1102 analyzes the left camera image to determine an angle θL and analyses the right camera image to determine an angle θR. The computing device then determines a distance between the candidate 1112 and a plane of the left camera 1104 and the right camera 1106 that is parallel with the web 1108. The computing device 1102 may use the equation 1 to make the determination:

$$D = B/(\tan \theta L + \tan \theta R) \qquad \text{Equation 1}$$

The computing device 1102 then compares the determined distance to the known distance "D" within a predetermined margin-of-error. If there is a match, the computing device 1102 then determines that the candidate 1112 to be at or near a plane of the web material and is most likely a real defect with the web. Upon determining the candidate 1112 is most likely a defect, a trigger alert may be transmitted and the trigger alert may include a timestamp and a web material location. Additionally, upon determining the candidate is a defect, the first image and/or the second image by be transmitted to a database and/or a graphical user interface (GUI). A similar process determines when a candidate for a defect is a foreign object and is positioned between the web 1108, the left camera 1104 and the right camera 1106.

In summary, by combining the methods and systems of U.S. Pat. No. 9,172,916 with the newly disclosed methods and systems of this specification, a more robust web monitoring system is disclosed.

The various techniques described herein may be implemented with hardware or software or, where appropriate, with a combination of both. These techniques may be embodied on the computing devices of the presently disclosed subject matter. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the presently disclosed invention. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the presently disclosed invention. When implemented on a general-purpose processor, the program code combines with the processor to provide a unique apparatus that operates to perform the processing of the presently disclosed invention.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A method for identifying defects in a web of material, comprising:
   receiving a first image from a first camera;
   receiving a second image from a second camera;
   identifying a candidate as a possible defect within the first image including identifying a first deviation in opaqueness of a portion of the web of material within the first image;
   determining a first x-y position of the candidate relative to the first image;
   identifying the candidate within the second image based on a predicted x-y position relative to the second image and identifying a second deviation in opaqueness of the portion of the web of material within the second image; and
   determining the candidate is a probable defect based on the first x-y position and a second x-y position of the candidate within the second image, wherein the first x-y position and the second x-y position predict the candidate is located on the web of material within a margin-of-error.

2. The method of claim 1 further comprising determining the predicted x-y position from a look-up table.

3. The method of claim 1, wherein:
   the first image is received from a first camera, having a first axis and a first field-of-view, is positioned in proximity to the web of material;
   the second image is received from a second camera, having a second axis and a second field-of-view, is positioned to have an overlap of the first field-of-view; and
   the first camera and second camera are further positioned such that the overlap is positioned to monitor a portion of the web of material.

4. The method of claim 3 further comprising determining the predicted x-y position from a known offset of at least an x-axis direction and a y-axis direction, wherein the x-axis direction and the y-axis direction are each approximated perpendicular to the first axis and the second axis.

5. The method of claim 4, wherein the known offset is based on a known pixel offset of the first field-of-view and the second field-of-view at a plane of the web of material.

6. The method of claim 3, wherein the first camera is further positioned such that the first axis is approximately perpendicular to the web of material.

7. The method of claim 6, wherein the second camera is further positioned such that the second axis is approximately perpendicular to the web of material.

8. The method of claim 7, wherein the predicted x-y position is based on a known distance along the first axis between the web of material and a first imaging sensor within the first camera.

9. The method of claim 8, wherein the predicted x-y position is further based on a known distance along the second axis between the web of material and a second imaging sensor within the second camera.

10. The method of claim 9, wherein the predicted x-y position is further based on a known distance between the first imaging sensor and the second imaging sensor.

11. The method of claim 1, wherein the first image and the second image are captured at approximately equivalent times.

12. The method of claim 1, wherein upon determining the candidate is a probable defect transmitting a trigger alert and the trigger alert includes a timestamp and web material location for the candidate.

13. The method of claim 1, wherein upon determining the candidate is a probable defect, transmitting at least one of the first image and the second image to a database.

14. The method of claim 1, wherein upon determining the candidate is a probable defect transmitting at least one of the first image and the second image to a graphical user interface (GUI).

15. A computing device for identifying defects in a web of material, the computing device comprising:
   a memory; and
   at least one processor configured for:
      receiving a first image from a first camera;
      receiving a second image from a second camera;
      identifying a candidate as a possible defect within the first image including identifying a first deviation in opaqueness of a portion of the web of material within the first image;
      determining a first x-y position of the candidate within the first image identifying the candidate within the second image based on a predicted x-y position relative to the second image and identifying a second deviation in opaqueness of the portion of the web of material within the second image; and determining the candidate is a probable defect based on the first x-y position and a second x-y position of the candidate within the second image.

16. The computing device of claim 15, wherein upon determining the candidate is a probable defect, transmitting at least one of the first image and the second image to a database.

17. The computing device of claim 15, wherein upon determining the candidate is a probable defect transmitting at least one of the first image and the second image to a graphical user interface (GUI).

18. A non-transitory computer-readable storage medium, the non-transitory computer-readable storage medium storing instructions to be implemented on at least one computing device including at least one processor, the instructions when executed by the at least one processor cause the at least one computing device to perform a method for identify defects in a web of material, the method comprising:

receiving a first image from a first camera;

receiving a second image from a second camera;

identifying a candidate as a possible defect within the first image including identifying a first deviation in opaqueness of a portion of the web of material within the first image;

determining a first x-y position of the candidate within the first image identifying the candidate within the second image based on a predicted x-y position relative to the second image and identifying a second deviation in opaqueness of the portion of the web of material within the second image; and determining the candidate is a probable defect based on the first x-y position and a second x-y position of the candidate within the second image.

19. The non-transitory computer-readable storage medium of claim 18, wherein upon determining the candidate is a probable defect, transmitting at least one of the first image and the second image to a database.

20. The non-transitory computer-readable storage medium of claim 18, wherein upon determining the candidate is a probable defect transmitting at least one of the first image and the second image to a graphical user interface (GUI).

* * * * *